United States Patent
Baba et al.

(10) Patent No.: US 8,427,571 B2
(45) Date of Patent: Apr. 23, 2013

(54) OPTICAL UNIT AND IMAGING APPARATUS

(75) Inventors: Tomohiko Baba, Kanagawa (JP); Louis Sander, Eindhoven (NL)

(73) Assignees: Sony Corporation, Tokyo (JP); Anteryon BV, Eindhoven (NL)

( * ) Notice: Subject to any disclaimer, the term of this patent is extended or adjusted under 35 U.S.C. 154(b) by 335 days.

(21) Appl. No.: 12/818,641

(22) Filed: Jun. 18, 2010

(65) Prior Publication Data

US 2010/0328522 A1    Dec. 30, 2010

Related U.S. Application Data

(63) Continuation-in-part of application No. 12/371,160, filed on Feb. 13, 2009.

(30) Foreign Application Priority Data

Feb. 13, 2009 (JP) ................................. 2009-032046
Jun. 26, 2009 (JP) ................................. 2009-152090

(51) Int. Cl.
    *G02B 13/16* (2006.01)
(52) U.S. Cl.
    USPC .......................................... 348/335; 396/382
(58) Field of Classification Search .................. 348/335; 359/771; 396/382
    See application file for complete search history.

(56) References Cited

U.S. PATENT DOCUMENTS

| | | | | |
|---|---|---|---|---|
| 7,841,785 B2 * | 11/2010 | Hirao et al. | .................... | 396/439 |
| 8,149,525 B2 * | 4/2012 | Do | .................. | 359/797 |
| 2006/0044450 A1 | 3/2006 | Wolterink et al. | | |
| 2007/0201141 A1 * | 8/2007 | Kato et al. | ..................... | 359/680 |
| 2008/0130143 A1 * | 6/2008 | Oh et al. | ......................... | 359/794 |
| 2009/0225441 A1 | 9/2009 | Do | | |

FOREIGN PATENT DOCUMENTS

| | | |
|---|---|---|
| WO | WO2008102773 | 8/2008 |
| WO | WO2008108011 | 9/2008 |

OTHER PUBLICATIONS

European Search Report corresponding to European Serial No. 10000832.5 dated May 18, 2010.

* cited by examiner

*Primary Examiner* — W. B. Perkey
*Assistant Examiner* — Linda B Smith
(74) *Attorney, Agent, or Firm* — SNR Denton US LLP

(57) ABSTRACT

An optical unit includes: a first lens group; and a second lens group, which are arranged in order from an object side toward an image surface side, wherein the first lens group includes a first lens element, a first transparent body, and a second lens element, which are arranged in order from the object side toward the image surface side, and the second lens group includes a third lens element, a second transparent body and a fourth lens element, which are arranged in order from the object side toward the image surface side.

23 Claims, 11 Drawing Sheets

*FIG.6A*          *FIG.6B*          *FIG.6C*
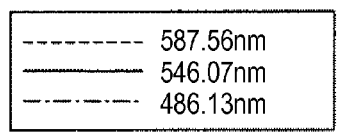
------- 587.56nm
——— 546.07nm
—·—·— 486.13nm
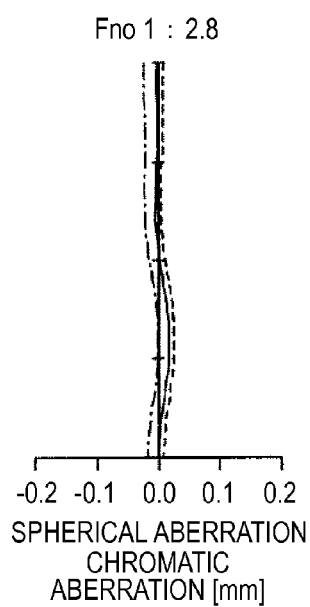
Fno 1 : 2.8
-0.2 -0.1 0.0 0.1 0.2
SPHERICAL ABERRATION
CHROMATIC ABERRATION [mm]
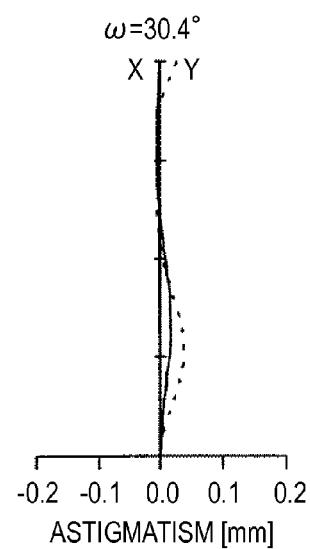
ω=30.4°
X   Y
-0.2 -0.1 0.0 0.1 0.2
ASTIGMATISM [mm]
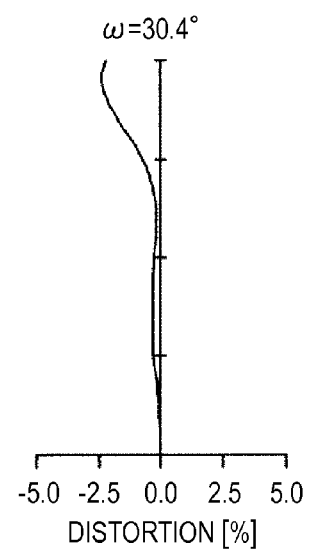
ω=30.4°
-5.0 -2.5 0.0 2.5 5.0
DISTORTION [%]

FIG.8A
FIG.8B
FIG.8C
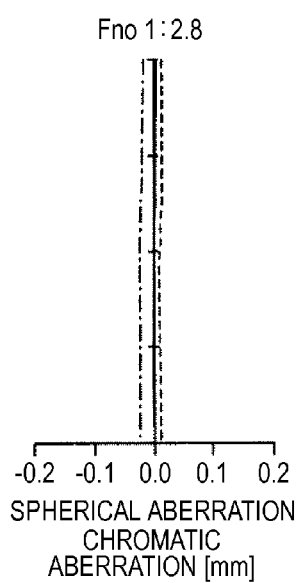
Fno 1:2.8
-0.2 -0.1 0.0 0.1 0.2
SPHERICAL ABERRATION
CHROMATIC
ABERRATION [mm]
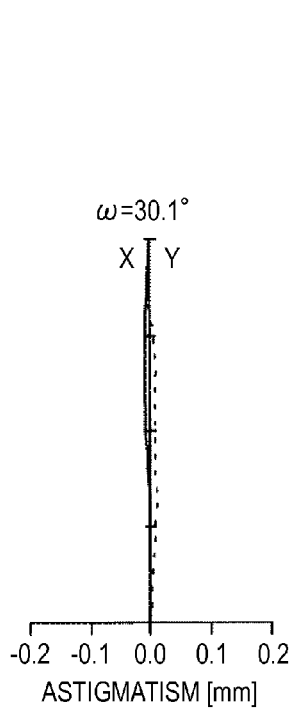
ω=30.1°
X  Y
-0.2 -0.1 0.0 0.1 0.2
ASTIGMATISM [mm]
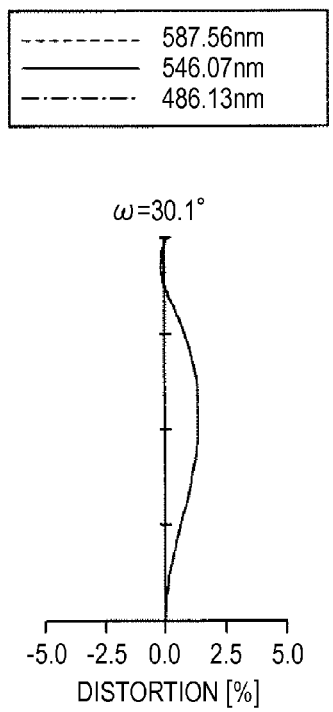
------ 587.56nm
——— 546.07nm
—·—·— 486.13nm
ω=30.1°
-5.0 -2.5 0.0 2.5 5.0
DISTORTION [%]

OPTICAL UNIT AND IMAGING APPARATUS

RELATED APPLICATION DATA

This application is a continuation-in-part of U.S. application Ser. No. 12/371,160, filed on Feb. 13, 2009, which is fully incorporated herein for all purpose to the extent permitted by law. This application also claims priority to Japanese Patent Applications P2009-032046 filed in the Japanese Patent Office on Feb. 13, 2009 and P2009-152090 filed in the Japanese Patent Office on Jun. 26, 2009, which are fully incorporated herein by reference to the extent permitted by law.

BACKGROUND OF THE INVENTION

1. Field of the Invention

The invention relates to an optical unit and an imaging apparatus applied to imaging equipment.

2. Description of the Related Art

In imaging equipment mounted on a cellular phone, a personal computer (PC) and the like in recent years, high resolution, low costs and miniaturization are strongly required.

A cell pitch of imaging devices such as a CCD (Charge Coupled Device) or CMOS (Complementary Metal Oxide Semiconductor) image sensors and the like has been dramatically miniaturized, and higher imaging performance is required for an optical system as compared with a normal optical system, in which optical aberration, particularly axial chromatic aberration is suppressed.

Additionally, a technique is known, in which a large number of lenses are manufactured at a time in a wafer state to reduce costs in response to price request.

As an example of manufacturing a large number of lenses at a time in a wafer state, for example, there is a technique represented by the one disclosed in US 2006/0044450A1 (Patent Document 1).

SUMMARY OF THE INVENTION

In Patent Document 1, various techniques in wafer level optics are presented, however, since the technique was directed to the small number of pixels such as CIF or VGA at first, the technique is not at a practical level as optical performance for more than three megapixels.

That is, when the technique is intended to be introduced at high pixel number of more than three megapixel, high-level optical design in which axial chromatic aberration and other aberrations are sufficiently reduced is necessary.

Thus, it is desirable to provide an optical unit and an imaging apparatus which are capable of realizing the optimum lens in wafer level optics.

An optical unit according to an embodiment of the invention includes a first lens group and a second lens group, which are arranged in order from an object side toward an image surface side, in which the first lens group includes a first lens element, a first transparent body and a second lens element, which are arranged in order from the object side toward the image surface side, and in which the second lens group includes a third lens element, a second transparent body and a fourth lens element, which are arranged in order from the object side toward the image surface side.

An optical unit according to another embodiment of the invention includes a first lens group and a second lens group, which are arranged in order from an object side toward an image surface side, in which the first lens group includes a first lens element, a first buffer layer, a first transparent body and a second lens element, which are arranged in order from the object side toward the image surface side, and in which the second lens group includes a third lens element, a second transparent body, a second buffer layer and a fourth lens element, which are arranged in order from the object side toward the image surface side.

An imaging apparatus according to still another embodiment of the invention includes an imaging device and an imaging lens which forms a subject image on the imaging device, in which the imaging lens has a first lens group and a second lens group, which are arranged in order from an object side toward an image surface side, in which the first lens group includes a first lens element, a first transparent body and a second lens element, which are arranged in order from the object side toward the image surface side, and in which the second lens group includes a third lens element, a second transparent body and a fourth lens element, which are arranged in order from the object side toward the image surface side.

According to the embodiments of the invention, it is possible to realize the optimum lens in waver level optics.

BRIEF DESCRIPTION OF THE DRAWINGS

FIG. 6A to FIG. 6C are aberration graphs showing spherical aberration, astigmatism and distortion in Example 2;

FIG. 8A to FIG. 8C are aberration graphs showing spherical aberration (chromatic aberration), astigmatism and distortion in Example 3;

DESCRIPTION OF THE PREFERRED EMBODIMENTS

Hereinafter, embodiments of the invention will be explained with reference to the attached drawings.

The explanation will be made in the following order.

1. First Embodiment (a first configuration example of an imaging lens to which an optical unit is applied)

2. Second Embodiment (a second configuration example of the imaging lens to which the optical unit is applied)

3. Third Embodiment (a third configuration example of the imaging lens to which the optical unit is applied)

4. Fourth Embodiment (a fourth configuration example of the imaging lens to which the optical unit is applied)

5. Fifth Embodiment (a fifth configuration example of the imaging lens to which the optical unit is applied)

6. Sixth Embodiment (a configuration example of an imaging apparatus)

<1. First Embodiment>

Figure 1:
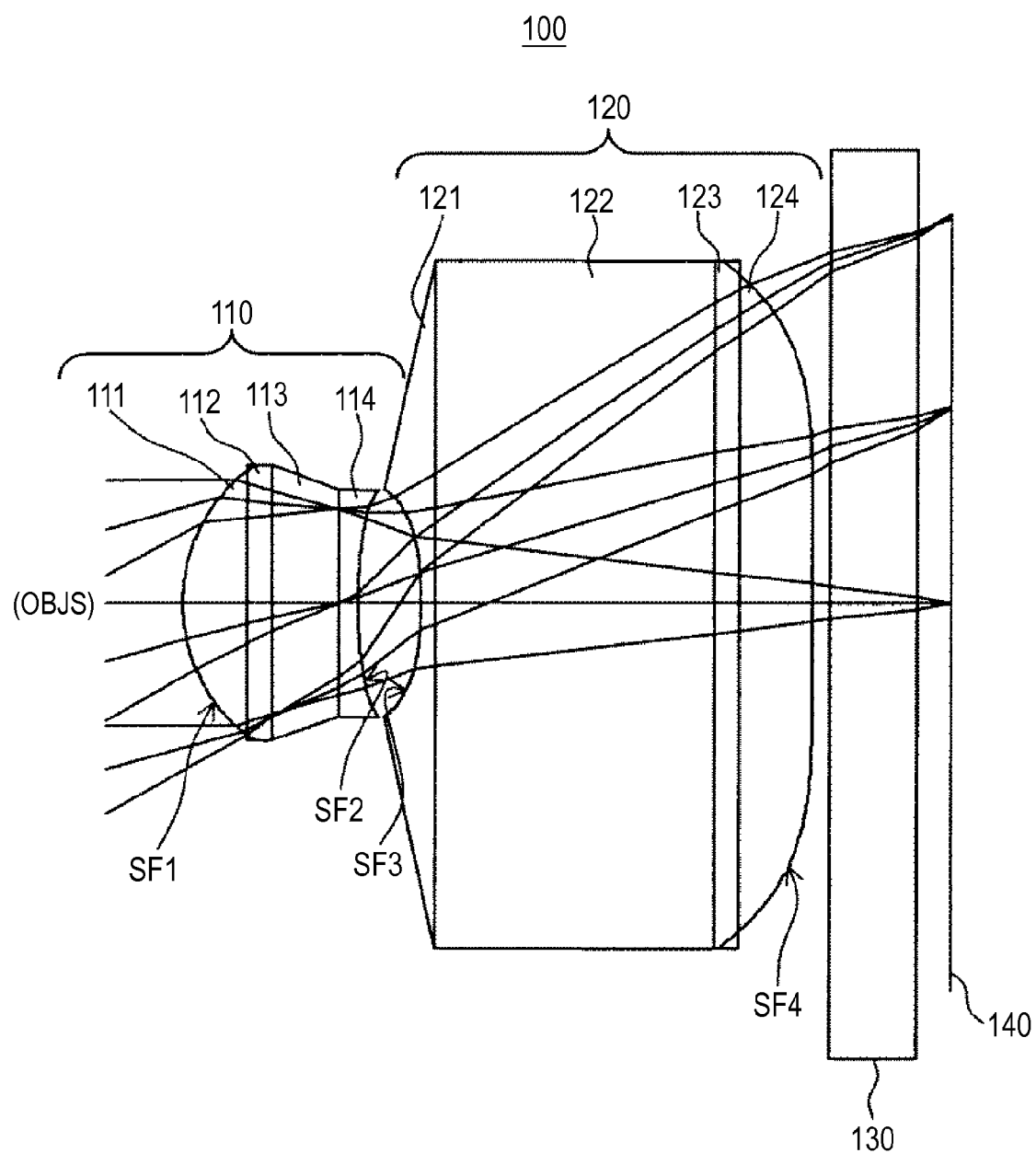
FIG. 1 is a view showing a configuration example of an imaging lens according to a first embodiment of the invention.

FIG. 1 is a view showing a configuration example of an imaging lens to which an optical unit according to a first embodiment of the invention is applied.

An imaging lens 100 according to the first embodiment includes a first lens group 110, a second lens group 120, a cover glass 130 and an image surface 140, which are arranged in order from an object side OBJS toward an image surface side as shown in FIG. 1.

The imaging lens 100 is formed as a single focal lens. The first lens group 110 and the second lens group 120 form an optical unit.

Each of the first lens group 110 and the second lens group 120 is formed by a joined body including two lens elements arranged at both sides of a transparent body.

Specifically, the first lens group 110 includes a first lens element 111, a first buffer layer 112, a first transparent body 113 and a second lens element 114 arranged in order from the object side OBJS to the image surface 140 side, which is formed by the joined body of them.

The second lens group 120 includes a third lens element 121, a second transparent body 122, a second buffer layer 123 and a fourth lens element 124 arranged in order from the object side OBJS to the image surface 140 side, which is formed by the joined body of them.

The first buffer layer 112 and the second buffer layer 123 constitute a part of the lens and are made of the same material as the lens material. The first buffer layer 112 and the second buffer layer 123 are designed and manufactured as a part of the lens at which a predetermined accuracy is not obtained.

As described above, each of the first lens group 110 and the second lens group 120 is formed by the joined body of the lens elements and the transparent body, therefore, the imaging lens 100 includes a first surface SF1, a second surface SF2, a third surface SF3 and a fourth surface SF4 as lens surfaces as a whole.

The first surface SF1 is formed by an object-side surface of the first lens element 111 and the second surface SF2 is formed by an image surface-side surface of the second lens element 114.

The third surface SF3 is formed by an object-side surface of the third lens element 121 and the fourth surface SF4 is formed by an image surface-side surface of the fourth lens element 124.

The imaging lens 100 according to the embodiment is formed so that one of the first lens group 110 and the second lens group 120 has positive power and the other has negative power.

In the imaging lens 100 which is the single focal lens, it is assumed that an imaging surface (image reception surface) of a solid-state imaging device such as a CCD sensor, a CMOS sensor and the like is arranged on the image surface 140.

The cover glass 130 is arranged between the fourth surface SF4 and the image surface 140. It is also preferable that an optical element is arranged between the fourth surface SF4 and the image surface 140, in addition to the cover glass 130, an infrared cutoff filter and a low-pass filter which are made of resin or glass.

In the embodiment, the left side is the object side (front) and the right side is the image surface side (back) in FIG. 1.

Luminous flux incident from the object side is imaged on the image surface 140.

Hereinafter, a configuration and operation of the imaging lens according to the embodiment will be explained.

In the first lens group 110, the first transparent body 113 is formed by a tabular glass substrate in which, for example, an Abbe number vg1 is small and a refractive index ng1 is high.

The first buffer layer 112 is formed on the object-side surface of the first transparent body (first glass substrate) 113, and the first lens element 111 is bonded further at the object side OBJS of the first buffer layer 112.

The first lens element 111 is formed by an aspherical lens in which the surface at the object side forming the first surface SF1 has a convex shape and an Abbe number vs1 is large.

The second lens element 114 is bonded at the image surface-side surface of the first transparent body (first glass substrate) 113.

The second lens element 114 is formed by an aspherical lens in which the surface of the image surface side forming the second surface SF2 has a concave shape.

In the second group 120, the second transparent body 122 is formed by a tabular glass substrate in which, for example, an Abbe number vg2 is large and a refractive index ng2 is low.

The third lens element 121 is bonded at the object-side surface of the second transparent body (second glass substrate) 122.

The third lens element 121 is formed by the aspherical lens in which the object-side surface forming the third surface SF3 has the concave shape.

The second buffer layer 123 is formed at the image surface-side surface of the second transparent body (second glass substrate) 122, and the fourth lens element 124 is bonded further at the image surface side of the second buffer layer 123.

The fourth lens element 124 is formed by an aspherical lens in which the surface of the image surface side forming the fourth surface SF4 is a convex shape or having a concavo-convex shape having both concavity and convexity.

Figure 2:
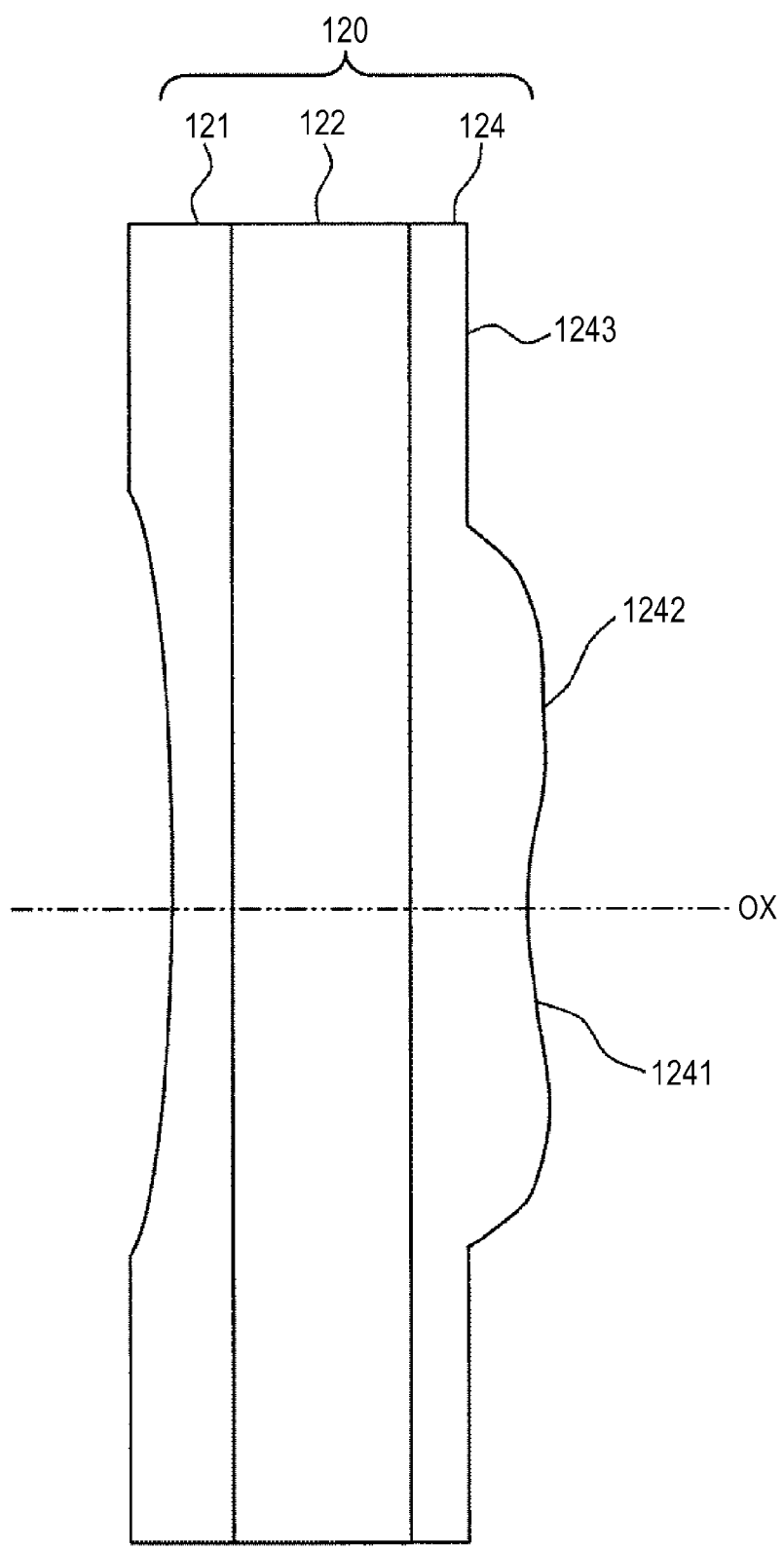
FIG. 2 is a view schematically showing an example of the surface shape of a fourth lens element according to the embodiment.

FIG. 2 is a view schematically showing an example of the surface shape of the fourth lens element 124 according to the embodiment.

In FIG. 2, the second lens group 120 is shown except the second buffer layer.

The fourth lens element 124 of FIG. 2 is formed by a flat concavo-convex lens in which the object side is FLAT and the image surface-side has both concavity and convexity.

The fourth lens element 124 has a concave portion 1241 in which the periphery of the optical axis including an optical axis OX is formed in a convex shape and a convex portion 1242 in which the periphery of the further outer peripheral side of the concave portion 1241 is formed in a convex shape.

Moreover, the fourth lens element 124 has a flat portion 1243 in which the periphery of the further outer peripheral side of the convex portion 1242 is formed to be flat.

In the following explanation, there is a case that the first transparent body 113 is represented as the first glass substrate using the same sign and the second transparent body 122 is represented as the second glass substrate by using the same sign.

The first lens element 111, the second lens element 114, the third lens element 121 and the fourth lens element 124 are made of ultraviolet (UV) curing resin, thermosetting resin, plastic or the like.

Here, the first buffer layer 112 and the second buffer layer 123 are made of the same material as the lens material, which are part of the lens, however, they are designed and manufactured, defining part in which accuracy is not obtained as the buffer layer separately.

The reason that the accuracy is not obtained is that 5% to 7% contraction occurs at the time of curing in the UV curing resin, the thermosetting resin, plastic or the like, and it is difficult to predict contraction behavior due to combination of this contraction and adhesion to the substrate.

As described above, the imaging lens 100 according to the first embodiment is formed by the lenses having two groups and six pieces.

The first lens group 110 is formed by the first surface SF1 of the aspherical lens having the convex shape and large Abbe number vs1, the first transparent body (first glass substrate) 113 having small Abbe number vg1 and high refractive index ng1 and the second surface SF2 of the aspherical lens having the concave shape from the object side toward the image surface side.

The second lens group 120 is formed by the third surface SF3 of the aspherical lens having the concave shape, the second transparent body (second glass substrate) 122 having large Abbe number vg2 and low refractive index ng2 and the fourth surface SF4 of the aspherical lens from the object side toward the image surface side.

The imaging lens 100 as a single focal lens is configured so as to satisfy the following conditional expressions (1) to (13).

In the conditional expression (1), a condition of the refractive index ng1 of the first glass substrate (first transparent body) 113 in the first lens group 110 is defined.

$$1.65 \leq ng1 \leq 2.2 \quad (1)$$

In the imaging lens 100, the first glass substrate having the high refractive index ng1 as the first transparent body 113 is used in the first lens group 110, thereby reducing an incident angle of light passing through the first surface SF1 as well as reducing astigmatism and coma aberration generated here.

The upper limit of the conditional expression (1) chiefly depends on the limit of materials. The upper limit of the refractive index of materials existing at present is approximately 2.2, therefore, there is the upper limit in the refractive index ng1 of the first glass substrate 113.

The optimum condition is represented by the conditional expression (1).

In the conditional expression (2), a condition of the Abbe number vg1 of the first glass substrate 113 in the first lens group 110 is defined in a conditional expression (2).

$$12 \leq vg1 \leq 45 \quad (2)$$

In the first lens group 110, the chromatic aberration is reduced by the convex lens forming the first lens element 111 having large Abbe number and the subsequent first glass substrate 113 having small Abbe number. When the Abbe number vg1 of the first glass substrate 113 is large, it is difficult to reduce the chromatic aberration, and when the Abbe number vg1 is small, there is the lower limit due to the limit of materials in the same manner as described above.

The optimum condition is represented by the conditional expression (2).

In the conditional expressions (3) and (4), conditions of a focal length fg1 of the first lens group 110 and a focal length fg2 of the second lens group 120 are defined.

$$1.2 \leq fg1 \leq 4 \quad (3)$$

$$-10 \leq fg2 \leq -1.2 \quad (4)$$

In order to correct various aberrations by a synergistic effect of the first lens group 110 and the second lens group 120, it is preferable that one of them has positive power and the other has negative power.

Since it is necessary that the optical overall length is short here, it is desirable that the first lens group 110 has positive power and the second lens group 120 has negative power.

However, this condition overreaches, even the extremely small decentering between groups seriously affects characteristics, which narrows the manufacturing tolerance.

The optimum conditions are represented by the conditional expressions (3) and (4).

In the conditional expression (5), a condition of the Abbe number vs1 of the first lens element 111 which forms the first surface SF1 is defined. As described above, the first lens element 111 is formed by an aspherical lens having the convex shape and large Abbe number vs1.

$$45 \leq vs1 \leq 100 \quad (5)$$

In the first lens group 110, the chromatic aberration is reduced by the convex lens having large Abbe number and the subsequent first glass substrate 113 having small Abbe number.

When the Abbe number is small, it is difficult to reduce the color aberration, and there does not exist a material having extremely large Abbe number in the limit of materials.

Therefore, the optimum condition is represented by the conditional expression (5).

In the conditional expression (6), a condition of the refractive index ng2 of the second glass substrate (second transparent body) 122 in the second lens group 120 is defined.

$$1.2 \leq ng2 \leq 1.65 \quad (6)$$

In the second lens group 120, it is desirable that the astigmatism and coma aberration are corrected more in the opposite manner to the first lens group 110, therefore, it is preferable that the refractive index ng2 of the second glass substrate 122 is small.

The upper limit of the refractive index ng2 of the second glass substrate 122 is determined by the above and the lower limit is determined due to the limit of materials in the same manner as described above.

The optimum condition is represented by the conditional expression (6).

In the conditional expression (7), a condition of the Abbe number vg2 of the second glass substrate 122 in the second lens group 120 is defined.

$$35 \leq vg2 \leq 100 \quad (7)$$

In the second lens group 120, the optimum overall achromatization is performed by the second glass substrate 122 having large Abbe number. When the Abbe number is small, namely, when the dispersion is large, chromatic aberration which has been reduced till now occurs, which is not desirable. The upper limit of the Abbe number vg2 of the second glass substrate 122 is determined by the limit of materials in the same manner as described above.

Therefore, the optimum condition is represented by the conditional expression (7).

In the conditional expression (8), a condition of a curvature radius Rs4 of the image surface-side surface of the fourth lens element 124, namely, the fourth surface SF4 is defined. As described above, the fourth lens element 124 is formed by an aspherical lens.

$$Rs4 \leq -3 \text{ [mm] or } Rs4 \geq 10 \text{ [mm]} \quad (8)$$

In the case that the curvature radius Rs4 of the fourth surface SF4 is extremely positive, surfaces which are peripheral to the vicinity of the optical axis protrude in the image side, which will be the shape in which a ghost is generated easily because light reflected on the imaging device is reflected again on the fourth surface SF4.

At the same time, in the above case, since peripheral light is reflected to the periphery to more extent, the incident angle with respect to the imaging device (sensor) becomes sharp, which is not desirable.

Moreover, there arises a problem that a back focus is shortened due to the protruding portion. Further, when negative curvature becomes too sharp, field curvature will be negative and it is difficult to correct it.

The optimum condition for obtaining desirable camera performance by securing sufficient back focus and satisfying a desirable imager incident angle is represented by the conditional expression (8).

In the conditional expression (9), a condition of a thickness Tg1 of the first glass substrate 113 is defined.

$$0.2 \leq Tg1 \leq 0.7 \text{ [mm]} \quad (9)$$

In order to reduce the astigmatism and the coma aberration generated in the first lens group 110, it is preferable that the first glass substrate 113 is thin. Therefore, the upper limit is generated in the thickness Tg1 of the first glass substrate 113.

When the first glass substrate is too thin, warpage occurs in the substrate and it becomes difficult to manufacture the substrate. Therefore, there exists the lower limit in the first glass substrate 113.

Accordingly, the optimum condition is represented by the conditional expression (9).

In the conditional expression (10), a condition of a thickness Tg2 of the second glass substrate 122 is defined.

$$0.2 \leq Tg2 \leq 2.5 \text{ [mm]} \quad (10)$$

It is necessary that the astigmatism and the coma aberration are corrected to more extent in the second lens group 120, contrary to the first lens group 110, therefore, it is preferable that a thickness Tg2 of the second glass substrate 122 is the thickness in which the aberration does not become excessive.

The thickness Tg2 also depends on the whole optical length. When the thickness Tg2 of the second glass substrate 122 is too thick, the coma aberration particularly occurs to a great extent and characteristics deteriorate, and when the thickness is too thin, aberration correction becomes insufficient. Or, the warpage occurs in the substrate and it becomes difficult to manufacture the substrate in the same manner as described above.

Accordingly, the optimum condition is represented by the conditional expression (10).

In the conditional expression (11), a condition of a thickness Tbuf of the first buffer layer 112 and the second buffer layer 123 is defined.

$$0.005 \text{ [mm]} \leq Tbuf \leq 0.300 \text{ [mm]} \quad (11)$$

In the case of the convex shape or the periphery is similar to the convex shape, the buffer layer becomes necessary.

This is because it is difficult to obtain the accuracy of shape in the lens near the substrate when the lens is adhered to the substrate. When a thickness Tbuf of the buffer layer is too thick, the aberration occurs and optical characteristics, particularly the astigmatism and the core aberration deteriorate, and when the thickness is too thin, it is difficult to obtain the accuracy of shape in the vicinity of the boundary.

Accordingly, the optimum condition is represented by the conditional expression (11).

In the conditional expression (12), a condition of an Abbe number vs2 of the second lens element 114 is defined.

$$28 \leq vs2 \leq 65 \quad (12)$$

In order to correct the axial chromatic aberration, it is desirable that the Abbe number vs2 of the second lens element 114 is small.

The lower limit of the Abbe number vs2 is determined by the limit of materials of the second lens element 114.

On the other hand, when the Abbe number is larger, power of the first lens group 110 and the second lens group 120 is reduced, which reduces sensitivity of group decentering and widens the manufacturing tolerance. Therefore, the optimum value exists.

The optimum condition is represented by the conditional expression (12).

In the conditional expression (13), a condition of an Abbe number vs3 of the third lens element 121 is defined.

$$28 \leq vs3 \leq 42 \quad (13)$$

In order to correct the axial chromatic aberration, it is desirable that the Abbe number vs3 of the third lens element 121 is small.

The upper limit of the Abbe number vs3 is determined by the chromatic aberration and the lower limit is determined by the limit of materials of the second lens element 114. Therefore, there exists the optimum value.

The optimum condition is represented by the conditional expression (13).

The above conditional expressions (1) to (13) are common to Examples 1, 2 and 3 explained as follows, and any of them is appropriately applied according to need, thereby realizing preferable imaging performance and a compact optical system suitable to individual imaging device or an imaging apparatus.

The shape of the aspherical surface of the lens is represented by the following expression when the direction from the object side toward the image surface side is positive, "k" is a conic coefficient, A, B, C and D are aspherical coefficients and "r" is a central curvature radius. "y" represents the height of beam from the optical axis and "c" represents the reciprocal (1/r) of the central curvature radius "r", respectively.

X represents the distance from the tangent plane with respect to the aspherical top, A represents a 4th order aspherical coefficient, B represents a 6th order aspherical coefficient, C represents a 8th order aspherical coefficient, D represents a 10th order aspherical coefficient, E represents a 12th order aspherical coefficient and F represents a 14th order aspherical coefficient, respectively.

Aspherical Equation $$X = \frac{cy^2}{1 + \sqrt{1 - (1+k)c^2y^2}} + Ay^4 + By^6 + Cy^8 + Dy^{10} + Ey^{12} + Fy^{14}$$

Figure 3:
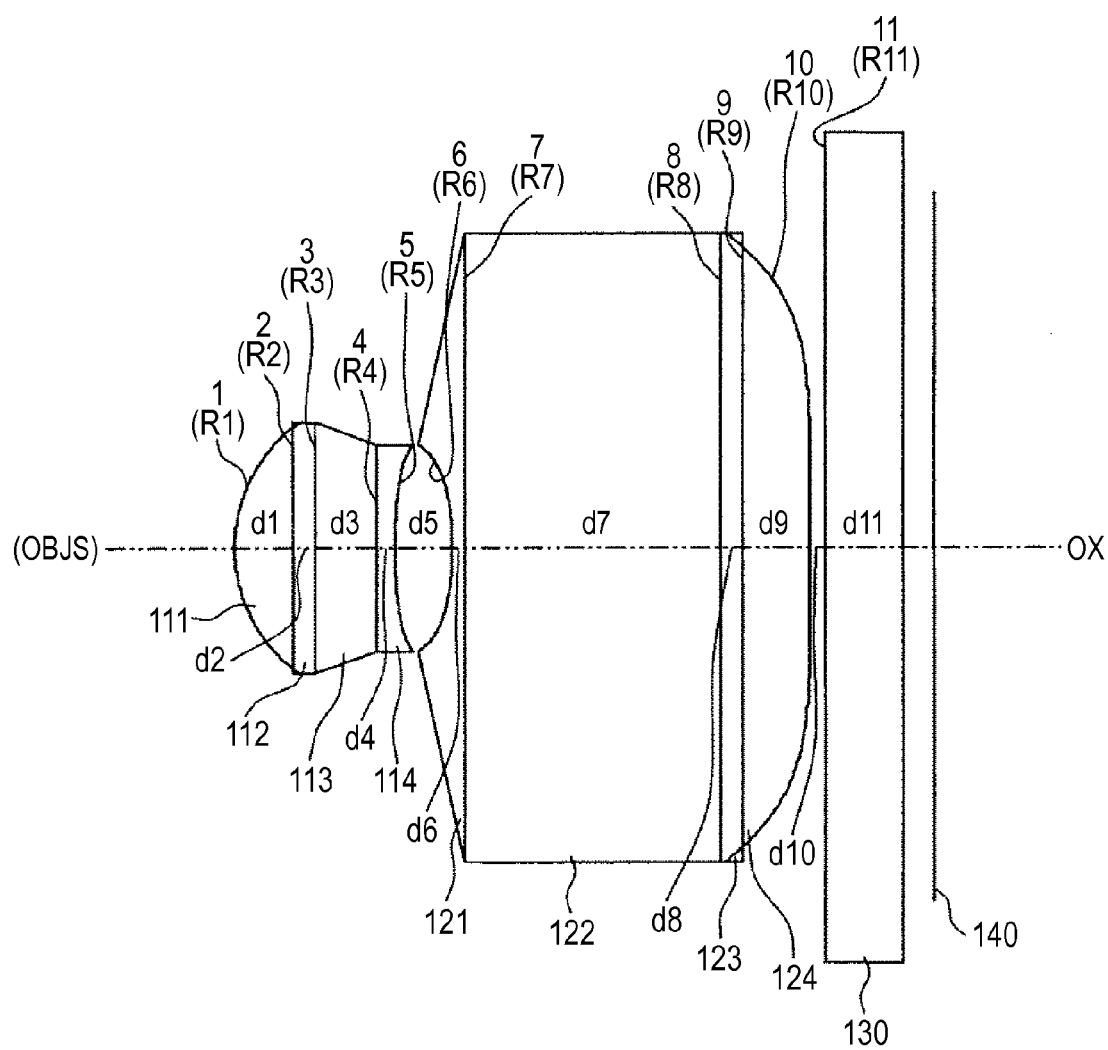
FIG. 3 is a view showing surface numbers given to respective lens and the substrates forming respective lens groups as well as the cover glass forming an imaging unit in the imaging lens according to the embodiment.

FIG. 3 is a view showing surface numbers given to respective lens and the substrates forming respective lens groups as well as the cover glass forming the imaging unit in the imaging lens according to the embodiment.

Specifically, the surface number of the number 1 is given to the object-side surface (convex surface) of the first lens element 111 and the surface number of the number 2 is given to the interface (bonded surface) between the image surface-side surface of the first lens element 111 and the object-side surface of the first buffer layer 112.

The surface number of the number 3 is given to the interface (bonded surface) between the image surface-side surface of the first buffer layer 112 and the object-side surface of the first transparent body (first glass substrate) 113 and the surface number of the number 4 is given to the interface (bonded surface) between the image surface-side surface of the first transparent body (first glass substrate) 113 and the object-side surface of the second lens element 114. The surface number of the number 5 is given to the image surface-side surface (concave surface) of the second lens element 114. The surface number of the number 6 is given to the object-side surface (concave surface) of the third lens element 121 and the surface number of the number 7 is given to the interface (bonded surface) between the image surface-side surface of the third lens element 121 and the object-side surface of the second transparent body (second glass substrate) 122.

The surface number of the number 8 is given to the interface (bonded surface) between the image surface-side surface of the second transparent body (second glass substrate) 122 and the object-side surface of the second buffer layer 123 and the surface number of the number 9 is given to the interface (bonded surface) between the image surface-side surface of the second buffer layer 123 and the object-side surface of the fourth lens element 124.

The surface number of the number 10 is given to the image side-side surface (aspherical surface) of the fourth lens element 124 and the surface number of the number 11 is given to the object-side surface of the cover glass 130.

As shown in FIG. 3, in the imaging lens 100 according to the embodiment, the central curvature radius of the object-side surface (number 1) 1 of the first lens element 111 is set to R1.

The central curvature radius of the interface (bonded surface) 2 between the image surface-side surface of the first lens element 111 and the object-side surface of the first buffer layer 112 is set to R2.

The central curvature radius of the interface (bonded surface) 3 between the image surface-side surface of the first buffer layer 112 and the object-side surface of the first transparent body (first glass substrate) 113 is set to R3.

The central curvature radius of the interface (bonded surface) 4 between the image surface-side surface of the first transparent body (first glass substrate) 113 and the object-side surface of the second lens element 114 is set to R4, and the central curvature radius of the image surface-side surface (concave surface) 5 of the second lens element 114 is set to R5.

The central curvature radius of the object-side surface (concave surface) 6 of the third lens element 121 is set to R6, and the central curvature radius of the interface (bonded surface) 7 between the image surface-side surface of the third lens element 121 and the object-side surface of the second transparent body (second glass substrate) 122 is set to R7.

The central curvature radius of the interface (bonded surface) 8 between the image surface-side surface of the second transparent body (second glass substrate) 122 and the object-side surface of the second buffer layer 123 is set to R8.

The central curvature radius of the interface (bonded surface) 9 between the image surface-side surface of the second buffer layer 123 and the object-side surface of the fourth lens element 124 is set to R9.

The central curvature radius of the image surface-side surface (aspherical surface) 10 of the fourth lens element 124 is set to R10, and the central curvature radius of the object-side surface 11 of the cover glass 130 is set to R11.

Note that the central curvature radiuses R2, R3, R4, R7, R8, R9 and R11 of the surfaces 2, 3, 4, 7, 8, 9, and 11 are infinite (INFINITY).

As shown in FIG. 3, the distance on an optical axis OX between the surface 1 and the surface 2 which is the thickness of the first lens element 111 is set to d1, and the distance on the optical axis OX between the surface 2 and surface 3 which is the thickness of the first buffer layer 112 is set to d2.

The distance on the optical axis OX between the surface 3 and the surface 4 which is the thickness of the first transparent body (first glass substrate) 113 is set to d3, and the distance on the optical axis OX between the surface 4 and the surface 5 which is the thickness of the second lens element 114 is set to d4.

The distance on the optical axis OX between the image surface-side surface 5 of the second lens element 114 and the object-side surface 6 of the third lens element is set to d5.

The distance on the optical axis OX between the surface 6 and the surface 7 which is the thickness of the third lens element 121 is set to d6, and the distance on the optical axis OX between the surface 7 and the surface 8 which is the thickness of the second transparent body (second glass substrate) 122 is set to d7.

The distance on the optical axis OX between the surface 8 and the surface 9 which is the thickness of the second buffer layer 123 is set to d8, and the distance on the optical axis OX between the surface 9 and the surface 10 which is the thickness of the fourth lens element 124 is set to d9.

The distance on the optical axis OX between image surface-side surface 10 of the fourth lens element 124 and the object-side surface 11 of the cover glass 130 is set to d10, and the distance on the optical axis OX between the object-side surface 11 and the image surface-side surface which is the thickness of the cover glass 130 is set to d11.

Example 1 including specific numeric values of the imaging lens will be shown as follows. In Example 1, surface numbers as shown in FIG. 3 are given to respective lens elements, buffer layers, glass substrates (transparent bodies) and the cover glass 130 forming the imaging unit in the imaging lens 100.

EXAMPLE 1

Respective numeric values of Example 1 are shown in Table 1, Table 2, Table 3 and Table 4. Respective numeric values of Example 1 correspond to the imaging lens 100 in FIG. 1.

Table 1 shows the curvature radius (R:mm), the distance (d:mm), the refractive index (nd) and the dispersion value (vd) of respective lens elements, the buffer layers, the glass substrates (transparent bodies) and the cover glass forming the imaging unit, which correspond to respective surface numbers of the imaging lens according to Example 1.

TABLE 1

Lens composition data of Example 1

| SURFACE NUMBER | R | d | nd | vd |
|---|---|---|---|---|
| 1 | 0.988 | 0.447 | 1.51 | 60.0 |
| 2 | INFINITY | 0.070 | 1.51 | 60.0 |
| 3 | INFINITY | 0.400 | 1.85 | 23.6 |
| 4 | INFINITY | 0.114 | 1.57 | 40.5 |
| 5 | 3.169 | 0.374 | | |
| 6 | −2.007 | 0.076 | 1.57 | 40.5 |
| 7 | INFINITY | 1.650 | 1.52 | 55.0 |
| 8 | INFINITY | 0.070 | 1.57 | 40.5 |
| 9 | INFINITY | 0.500 | 1.57 | 40.5 |
| 10 | −1100.000 | 0.100 | | |
| 11 | INFINITY | 0.500 | 1.52 | 64.1 |

Table 2 shows the 4th order, 6th order, 8th order, 10th order, 12th order and 14th order aspherical coefficients of the surface 1 of the first lens element 111, the surface 5 of the second lens element 114, the surface 6 of the third lens element 121 and the surface 10 of the fourth lens element 124 including aspherical surfaces according to Example 1.

In Table 2, K represents a conic constant, A represents the 4th order aspherical coefficient, B represents 6th order aspherical coefficient, C represents 8th order aspherical coefficient, D represents 10th order aspherical coefficient, E represents 12th order aspherical coefficient and F represents 14th order aspherical coefficient, respectively.

TABLE 2

Aspherical data of Example 1

| | | | | |
|---|---|---|---|---|
| 1ST SURFACE | K: 0.417E−1 | A: −0.363E−02 | B: 0.230E−01 | C: −0.708E−01 | D: 0.114E+00 |
| 5TH SURFACE | K: 0.453E+1 | A: 0.586E−01 | B: 0.390E+00 | C: −0.153E+01 | D: 0.362E+01 |
| 6TH SURFACE | K: 0.195E+1 | A: −0.204E+00 | B: −0.608E+00 | C: 0.180E+01 | D: −0.5198E+01 |
| 10TH SURFACE | K: −0.100E+2 | A: 0.176E−01 | B: −0.460E−01 | C: 0.235E−01 | D: −0.735E−02 |
| | | | | E: 0.118E−02 | F: −0.746E−04 |

Table 3 specifically shows a focal length f, a numerical aperture F, a half view angle ω, and a lens length H of the imaging lens 100 according to Example 1.

Here, the focal length f is set to 4.03 mm, the numerical aperture F is set to 2.8, the half view angle ω is set to 30.1 deg and the lens length H is set to 4.50 mm.

TABLE 3

Composition data of Example 1 f (focal length) = 4.03 mm
F (numerical aperture) = 2.8
ω (half view angle) = 30.1 deg
H (Lens length) = 4.50 mm Table 4 shows that the above respective conditional expressions (1) to (13) are satisfied in Example 1.

TABLE 4

Example 1/Values of conditional expressions

| CONDITIONAL EXPRESSION/ EXAMPLE | 1 |
|---|---|
| (1) ng1 | 1.85 |
| (2) vg1 | 23.6 |
| (3) fg1 | 2.52 |
| (4) fg2 | −3.54 |
| (5) vs1 | 60 |
| (6) ng2 | 1.52 |
| (7) vg2 | 55 |
| (8) Rs4 | −1100 |
| (9) Tg1 | 0.4 |
| (10) Tg2 | 1.650 |
| (11) Tbuf | 0.07 |
| (12) vs2 | 40.5 |
| (13) vs3 | 40.5 |

As shown in Table 4, in Example 1, the refractive index ng1 of the first glass substrate 113 of the first lens group 110 is set to 1.85, which satisfies the condition defined by the conditional expression (1). The Abbe number vg1 of the first glass substrate 113 of the first lens group 110 is set to 23.6, which satisfies the condition defined by the conditional expression (2).

The focal length fg1 of the first lens group 110 is set to 2.52, which satisfies the condition defined by the conditional expression (3). The focal length fg2 of the second lens group 120 is set to −3.54, which satisfies the condition defined by the conditional expression (4).

The Abbe number vs1 of the first lens element 111 including the first surface SF1 is set to 60, which satisfies the condition defined by the conditional expression (5).

The refractive index ng2 of the second glass substrate 122 of the second lens group 120 is set to 1.52, which satisfies the condition defined by the conditional expression (6). The Abbe number vg2 of the second glass substrate 122 of the second lens group 120 is set to 55, which satisfies the condition defined by the conditional expression (7).

The curvature radius Rs4 of the fourth surface SF4 corresponding to the image surface-side surface 10 of the fourth lens element 124 is set to −1100, which satisfies the condition defined by the conditional expression (8).

The thickness Tg1 of the first glass substrate 113 is set to 0.4 mm, which satisfies the condition defined by the conditional expression (9). The thickness Tg2 of the second glass substrate 122 is set to 1.650 mm, which satisfies the condition defined by the conditional expression (10).

The thickness Tbuf of the first buffer layer 112 and the second buffer layer 123 is set to 0.07 mm, which satisfies the condition defined by the conditional expression (11).

The Abbe number vs2 of the second lens element 114 is set to 40.5, which satisfies the condition defined by the conditional expression (12).

The Abbe number vs3 of the third lens element 121 is set to 40.5, which satisfies the condition defined by the conditional expression (13).

Figures 4A, 4B, 4C:
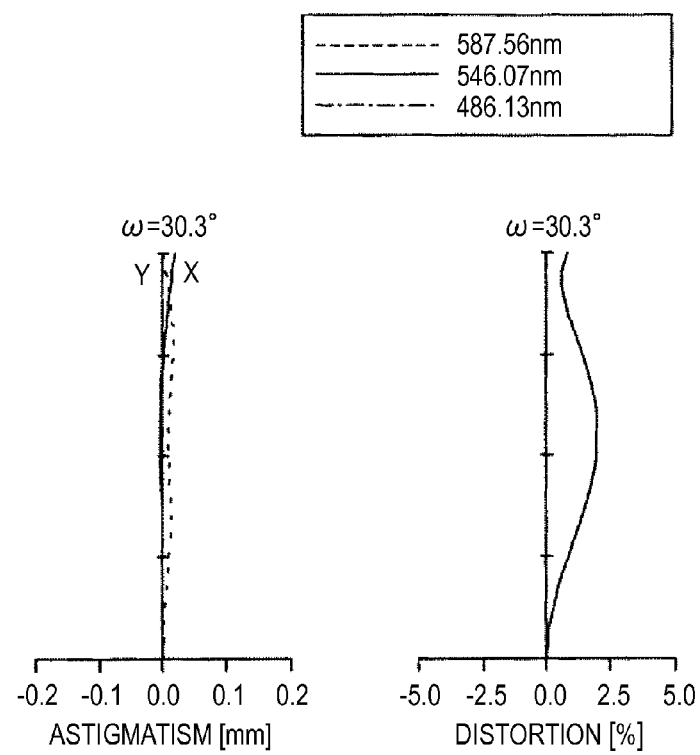
FIG. 4A to FIG. 4C are aberration graphs showing spherical aberration, astigmatism and distortion in Example 1.

FIGS. 4A to 4C are aberration graphs showing spherical aberration (chromatic aberration), astigmatism and distortion in Example 1. FIG. 4A shows the spherical aberration (chromatic aberration), FIG. 4B shows the astigmatism and FIG. 4C shows the distortion, respectively.

As can be seen from FIGS. 4A to 4C, the imaging lens including the optical unit in which various aberrations such as spherical, astigmatism and distortion are suitably corrected and which is excellent in imaging performance can be obtained according to the Example 1.

<2. Second Embodiment>

Figure 5:
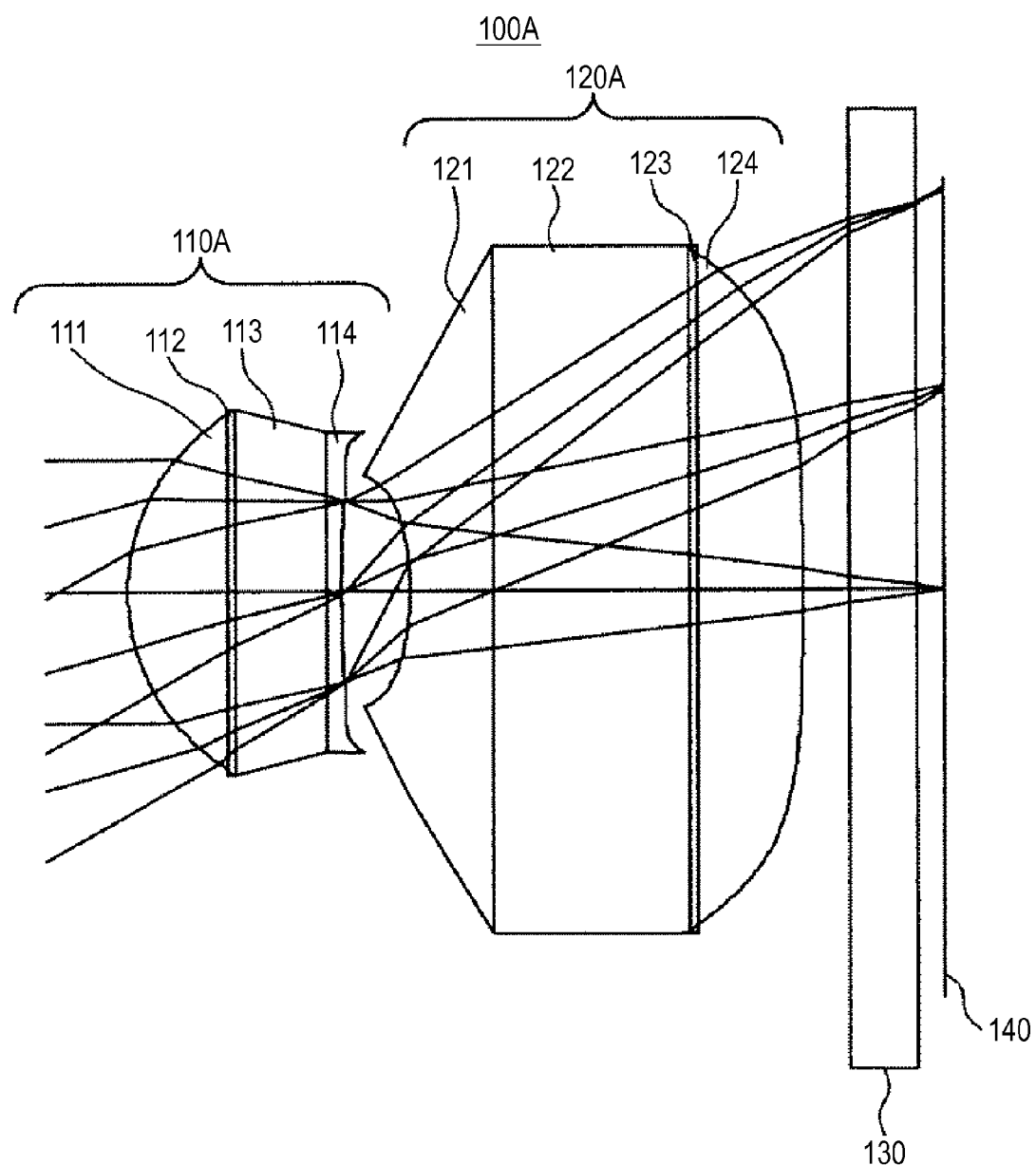
FIG. 5 is a configuration example of an imaging lens according to a second embodiment of the invention.

FIG. 5 is a configuration example of an imaging lens according to a second embodiment of the invention.

An imaging lens 100A according to the second embodiment shown in FIG. 5 has basically the same configuration as the imaging lens 100 according to the first embodiment, and is different from the imaging lens 100 in setting values such as parameters of respective components as shown below as Example 2.

Therefore, the detailed explanation of the imaging lens 100A is omitted here.

Example 2 including specific numeric values of the imaging lens will be shown below. In Example 2, surface numbers shown in FIG. 3 are given to respective lens elements, buffer layers and glass substrates (transparent bodies) and the cover glass 130 forming the imaging unit in the imaging lens 100A.

EXAMPLE 2

Respective numeric values of Example 2 are shown in Table 5, Table 6, Table 7 and Table 8. The respective numeric values of Example 2 correspond to the imaging lens 100A of FIG. 5.

Table 5 shows the curvature radius (R:mm), the distance (d:mm), the refractive index (nd) and the dispersion value (vd) of respective lens elements, the buffer layers, the glass substrates (transparent bodies) and the cover glass forming the imaging unit, which correspond to respective surface numbers of the imaging lens according to Example 2.

TABLE 5

Composition data of Example 2

| SURFACE NUMBER | R | d | nd | vd |
|---|---|---|---|---|
| 1 | 0.859 | 0.446 | 1.51 | 60.0 |
| 2 | INFINITY | 0.035 | 1.51 | 60.0 |
| 3 | INFINITY | 0.400 | 1.81 | 40.9 |
| 4 | INFINITY | 0.070 | 1.57 | 40.5 |
| 5 | 4.355 | 0.299 | | |
| 6 | −1.425 | 0.366 | 1.57 | 40.5 |
| 7 | INFINITY | 0.865 | 1.58 | 40.7 |
| 8 | INFINITY | 0.035 | 1.57 | 40.5 |
| 9 | INFINITY | 0.465 | 1.57 | 40.5 |
| 10 | −1100.000 | 0.100 | | |
| 11 | INFINITY | 0.300 | 1.52 | 64.1 |

Table 6 shows 4th order, 6th order, 8th order and 10th order aspherical coefficients of the surface 1 of the first lens element 111, the surface 4 of the first glass substrate 113, the surface 5 of the second lens element 114 and the surface 8 of the second glass substrate 122 which include aspheric surfaces according to Example 2.

In Table 6, K represents the conic constant, A represents the 4th order aspherical coefficient, B represents 6th order aspherical coefficient, C represents 8th order aspherical coefficient, D represents 10th order aspherical coefficient, respectively.

TABLE 6

Aspherical data of Example 2

| | | | | | |
|---|---|---|---|---|---|
| 1ST SURFACE | K: −0.609E+01 | A: 0.109E+01 | B: −0.198E+01 | C: −0.336E+01 | D: −0.223E+01 |
| 4TH SURFACE | K: 0.985E+01 | A: −0.102E+00 | B: 0.664E+00 | C: −0.768E+01 | D: 0.151E+02 |
| 5TH SURFACE | K: 0.680E+01 | A: −0.212E+00 | B: −0.161E+01 | C: 0.585E+01 | D: −0.308E+02 |
| 8TH SURFACE | K: −0.100E+02 | A: −0.107E+00 | B: 0.620E−01 | C: −0.482E−01 | D: 0.974E−02 |

Table 7 specifically shows the focal length f, the numerical aperture F, the half view angle ω, and the lens length H of the imaging lens 100A according to Example 2.

Here, the focal length f is set to 3.21 mm, the numerical aperture F is set to 2.8, the half view angle ω is set to 30.4 deg and the lens length H is set to 3.60 mm.

TABLE 7

Composition data of Example 2 f (focal number) = 3.21 mm
F (numerical aperture) = 2.8
ω (half view angle) = 30.4 deg
H (Lens length) = 3.60 mm Table 8 shows that the above respective conditional expressions (1) to (13) are satisfied in Example 2.

TABLE 8

Example 2/Values of conditional expressions

| CONDITIONAL EXPRESSION/ EXAMPLE | 2 |
|---|---|
| (1) ng1 | 1.81 |
| (2) vg1 | 40.9 |
| (3) fg1 | 1.96 |
| (4) fg2 | −2.51 |
| (5) vs1 | 60 |
| (6) ng2 | 1.58 |
| (7) vg2 | 40.7 |
| (8) Rs4 | −1100 |
| (9) Tg1 | 0.4 |
| (10) Tg2 | 0.865 |
| (11) Tbuf | 0.035 |
| (12) vs2 | 40.5 |
| (13) vs3 | 40.5 |

As shown in Table 8, in Example 2, the refractive index ng1 of the first glass substrate 113 of the first lens group 110 is set to 1.81, which satisfies the condition defined by the conditional expression (1). The Abbe number vg1 of the first glass substrate 113 of the first lens group 110 is set to 40.9, which satisfies the condition defined by the conditional expression (2).

The focal length fg1 of the first lens group 110 is set to 1.96, which satisfies the condition defined by the conditional expression (3). The focal length fg2 of the second lens group 120 is set to −2.51, which satisfies the condition defined by the conditional expression (4).

The Abbe number vs1 of the first lens element 111 including the first surface SF1 is set to 60, which satisfies the condition defined by the conditional expression (5).

The refractive index ng2 of the second glass substrate 122 of the second lens group 120 is set to 1.58, which satisfies the condition defined by the conditional expression (6). The Abbe number vg2 of the second glass substrate 122 of the second lens group 120 is set to 40.7, which satisfies the condition defined by the conditional expression (7).

The curvature radius Rs4 of the fourth surface SF4 corresponding to the image surface-side surface 10 of the fourth lens element 124 is set to −1100, which satisfies the condition defined by the conditional expression (8).

The thickness Tg1 of the first glass substrate 113 is set to 0.4 mm, which satisfies the condition defined by the conditional expression (9). The thickness Tg2 of the second glass substrate 122 is set to 0.865 mm, which satisfies the condition defined by the conditional expression (10).

The thickness Tbuf of the first buffer layer 112 and the second buffer layer 123 is set to 0.035 mm, which satisfies the condition defined by the conditional expression (11).

The Abbe number vs2 of the second lens element 114 is set to 40.5, which satisfies the condition defined by the conditional expression (12).

The Abbe number vs3 of the third lens element 121 is set to 40.5, which satisfies the condition defined by the conditional expression (13).

FIGS. 6A to 6C are aberration graphs showing spherical aberration (chromatic aberration), astigmatism and distortion in Example 2. FIG. 6A shows the spherical aberration (chromatic aberration), FIG. 6B shows the astigmatism and FIG. 6C shows the distortion, respectively.

As can be seen from FIGS. 6A to 6C, the imaging lens including the optical unit in which various aberrations such as spherical, astigmatism and distortion are suitably corrected and which is excellent in imaging performance can be obtained according to the Example 2.

<3. Third Embodiment>

Figure 7:
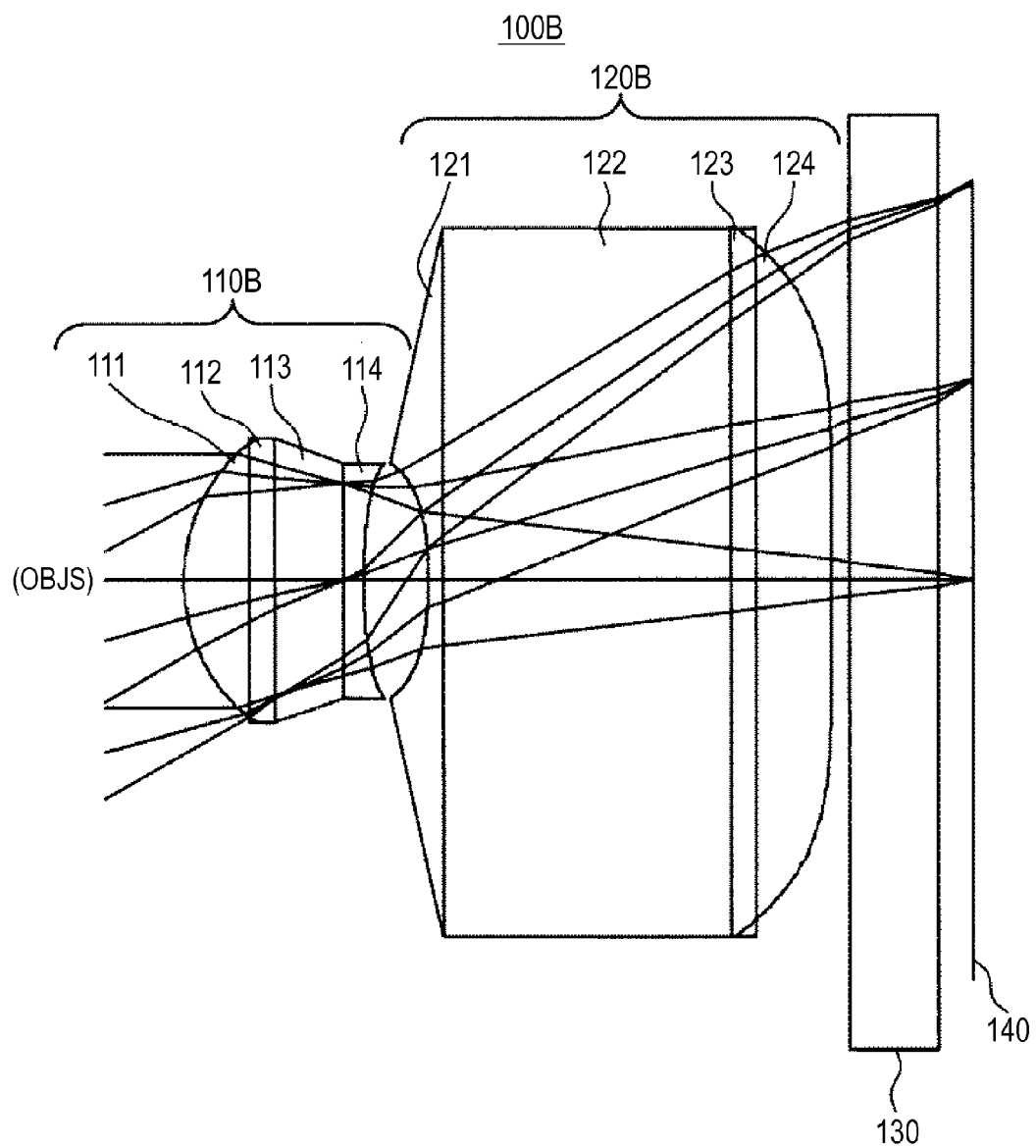
FIG. 7 is a configuration example of an imaging lens according to a third embodiment of the invention.

FIG. 7 is a configuration example of an imaging lens according to a third embodiment of the invention.

An imaging lens 100B according to the third embodiment shown in FIG. 7 has basically the same configuration as the imaging lens 100 according to the first embodiment, and is different from the imaging lens 100 in setting values such as parameters of respective components as shown below as Example 3.

Therefore, the detailed explanation of the imaging lens 100B is omitted here.

Example 3 including specific numerals of the imaging lens will be shown below. In Example 3, surface numbers shown in FIG. 3 are given to respective lens elements, buffer layers and glass substrates (transparent bodies) and the cover glass 130 forming the imaging unit in the imaging lens 100B.

EXAMPLE 3

Respective numeric values of Example 3 are shown in Table 9, Table 10, Table 11 and Table 12. The respective numeric values of Example 3 correspond to the imaging lens 100B of FIG. 7.

Table 9 shows the curvature radius (R:mm), the distance (d:mm), the refractive index (nd) and the dispersion value (vd) of respective lens elements, the buffer layers, the glass substrates (transparent bodies) and the cover glass forming the imaging unit, which correspond to respective surface numbers of the imaging lens according to Example 3.

TABLE 9

Composition data of Example 3

| SURFACE NUMBER | R | d | nd | vd |
|---|---|---|---|---|
| 1 | 1.04230 | 0.491 | 1.51 | 60.0 |
| 2 | INFINITY | 0.070 | 1.51 | 60.0 |
| 3 | INFINITY | 0.494 | 1.85 | 23.6 |
| 4 | INFINITY | 0.070 | 1.51 | 60.0 |
| 5 | 2.867 | 0.438 | | |
| 6 | −2.279 | 0.070 | 1.57 | 40.5 |
| 7 | INFINITY | 1.355 | 1.52 | 55.0 |
| 8 | INFINITY | 0.070 | 1.57 | 40.5 |
| 9 | INFINITY | 0.591 | 1.57 | 40.5 |
| 10 | −1100.000 | 0.100 | | |
| 11 | INFINITY | 0.500 | 1.52 | 64.1 |

Table 10 shows 4th order, 6th order, 8th order, 10th order, 12th order and 14th order aspherical coefficients of the surface 1 of the first lens element 111, the surface 5 of the second lens element 114, the surface 6 of the third lens element 121 and the surface 10 of the fourth lens element 124 which include aspheric surfaces according to Example 3.

In Table 10, K represents the conic constant, A represents the 4th order aspherical coefficient, B represents 6th order aspherical coefficient, C represents 8th order aspherical coefficient, D represents 10th order aspherical coefficient, E represents 12th order aspherical coefficient and F represents 14th order aspherical coefficient, respectively.

TABLE 10

Aspherical data of Example 3

| 1ST SURFACE | K: 0.917E−01 | A: −0.824E−02 | B: −0.126E−01 | C: 0.352E−02 | D: 0.117E−02 |
|---|---|---|---|---|---|
| 5TH SURFACE | K: 0.556E+01 | A: 0.774E−01 | B: 0.203E+00 | C: −0.498E+00 | D: 0.198E+01 |
| 6TH SURFACE | K: 0.643E+00 | A: −0.219E+00 | B: −0.651E−01 | C: −0.318E+00 | D: −0.484E+00 |
| 10TH SURFACE | K: −0.100E+2 | A: 0.594E−02 | B: −0.337E−01 | C: 0.219E−01 | D: −0.884E−02 |
| | | | | E: 0.177E−02 | F: −0.140E−03 |

Table 11 specifically shows the focal length f, the numerical aperture F, the half view angle ω, and the lens length H of the imaging lens 100C according to Example 3.

Here, the focal length f is set to 4.04 mm, the numerical aperture F is set to 2.8, the half view angle ω is set to 30.1 deg and the lens length H is set to 4.50 mm.

TABLE 11

Composition data of Example 3 f (focal number) = 4.04 mm
F (numerical aperture) = 2.8
ω (half view angle) = 30.1 deg
H (Lens length) = 4.50 mm Table 12 shows that the above respective conditional expressions (1) to (13) are satisfied in Example 3.

TABLE 12

Example 3/Values of conditional expressions

| CONDITIONAL EXPRESSION/ EXAMPLE | 3 |
|---|---|
| (1) ng1 | 1.85 |
| (2) vg1 | 23.6 |
| (3) fg1 | 2.685 |
| (4) fg2 | −4.02 |
| (5) vs1 | 60 |
| (6) ng2 | 1.52 |
| (7) vg2 | 55 |
| (8) Rs4 | −1100 |
| (9) Tg1 | 0.494 |
| (10) Tg2 | 1.355 |
| (11) Tbuf | 0.07 |
| (12) vs2 | 60 |
| (13) vs3 | 40.5 |

As shown in Table 12, in Example 3, the refractive index ng1 of the first glass substrate 113 of the first lens group 110 is set to 1.85, which satisfies the condition defined by the conditional expression (1). The Abbe number vg1 of the first glass substrate 113 of the first lens group 110 is set to 23.6, which satisfies the condition defined by the conditional expression (2).

The focal length fg1 of the first lens group 110 is set to 2.685, which satisfies the condition defined by the conditional expression (3). The focal length fg2 of the second lens group 120 is set to −4.02, which satisfies the condition defined by the conditional expression (4).

The Abbe number vs1 of the first lens element 111 including the first surface SF1 is set to 60, which satisfies the condition defined by the conditional expression (5).

The refractive index ng2 of the second glass substrate 122 of the second lens group 120 is set to 1.52, which satisfies the condition defined by the conditional expression (6). The Abbe number vg2 of the second glass substrate 122 of the second lens group 120 is set to 55, which satisfies the condition defined by the conditional expression (7).

The curvature radius Rs4 of the fourth surface SF4 corresponding to the image surface-side surface 10 of the fourth lens element 124 is set to −1100, which satisfies the condition defined by the conditional expression (8).

The thickness Tg1 of the first glass substrate 113 is set to 0.494 mm, which satisfies the condition defined by the conditional expression (9). The thickness Tg2 of the second glass substrate 122 is set to 1.355 mm, which satisfies the condition defined by the conditional expression (10).

The thickness Tbuf of the first buffer layer 112 and the second buffer layer 123 is set to 0.07 mm, which satisfies the condition defined by the conditional expression (11).

The Abbe number vs2 of the second lens element 114 is set to 60, which satisfies the condition defined by the conditional expression (12).

The Abbe number vs3 of the third lens element 121 is set to 40.5, which satisfies the condition defined by the conditional expression (13).

FIGS. 8A to 8C are aberration graphs showing spherical aberration (chromatic aberration), astigmatism and distortion in Example 3. FIG. 8A shows the spherical aberration (chromatic aberration), FIG. 8B shows the astigmatism and FIG. 8C shows the distortion, respectively.

As can be seen from FIGS. 8A to 8C, the imaging lens including the optical unit in which various aberrations such as spherical, astigmatism and distortion are suitably corrected and which is excellent in imaging performance can be obtained according to the Example 3.

<4. Fourth Embodiment>

Figure 9:
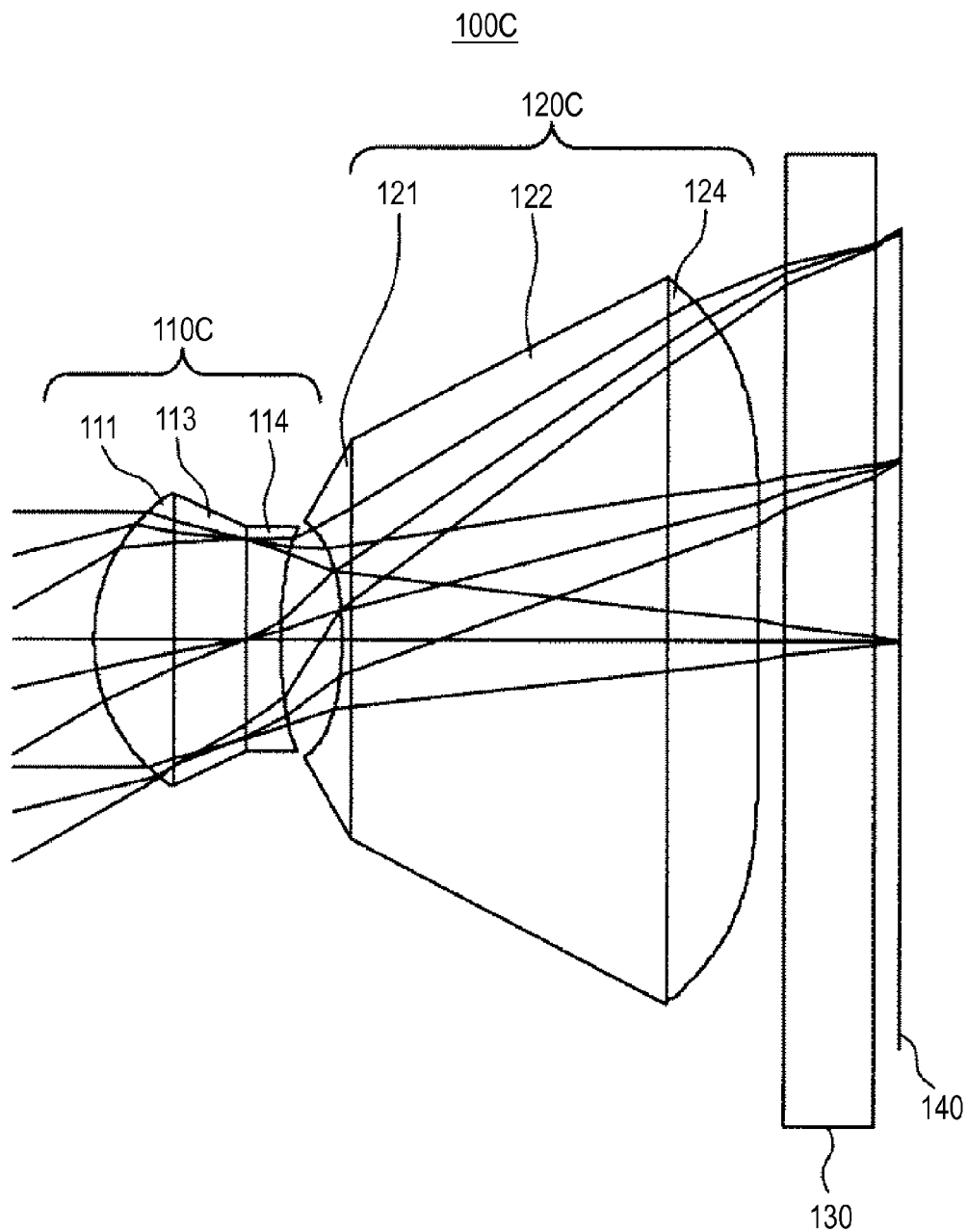
FIG. 9 is a view showing a configuration example of an imaging lens according to a fourth embodiment of the invention.

FIG. 9 is a view showing a configuration example of an imaging lens according to a fourth embodiment of the invention.

An imaging lens 100C according to the fourth embodiment shown in FIG. 9 shows a state in which the buffer layer of the imaging lens 100 according to the first embodiment shown in FIG. 1 is not shown, illustrating an example of the imaging lens formed by actual design.

The imaging lens 100C of FIG. 9 is equivalent to the imaging lens 100 in FIG. 1 as functions of the imaging lens though the imaging lens 100C is different in the shapes of the first transparent body (first glass substrate) 113 and the second transparent body (second glass substrate) 122, and the difference is not essential.

The detailed explanation of the imaging lens 100C is omitted here.

Also in the imaging lens 100C according to the fourth embodiment, it is possible to obtain the same aberration characteristics as the aberration characteristics shown in FIG. 4A to FIG. 4C.

That is to say, also in the fourth embodiment, the imaging lens including the optical unit in which various aberrations such as spherical, astigmatism and distortion are suitably corrected and which is excellent in imaging performance can be obtained.

<5. Fifth Embodiment>

Figure 10:
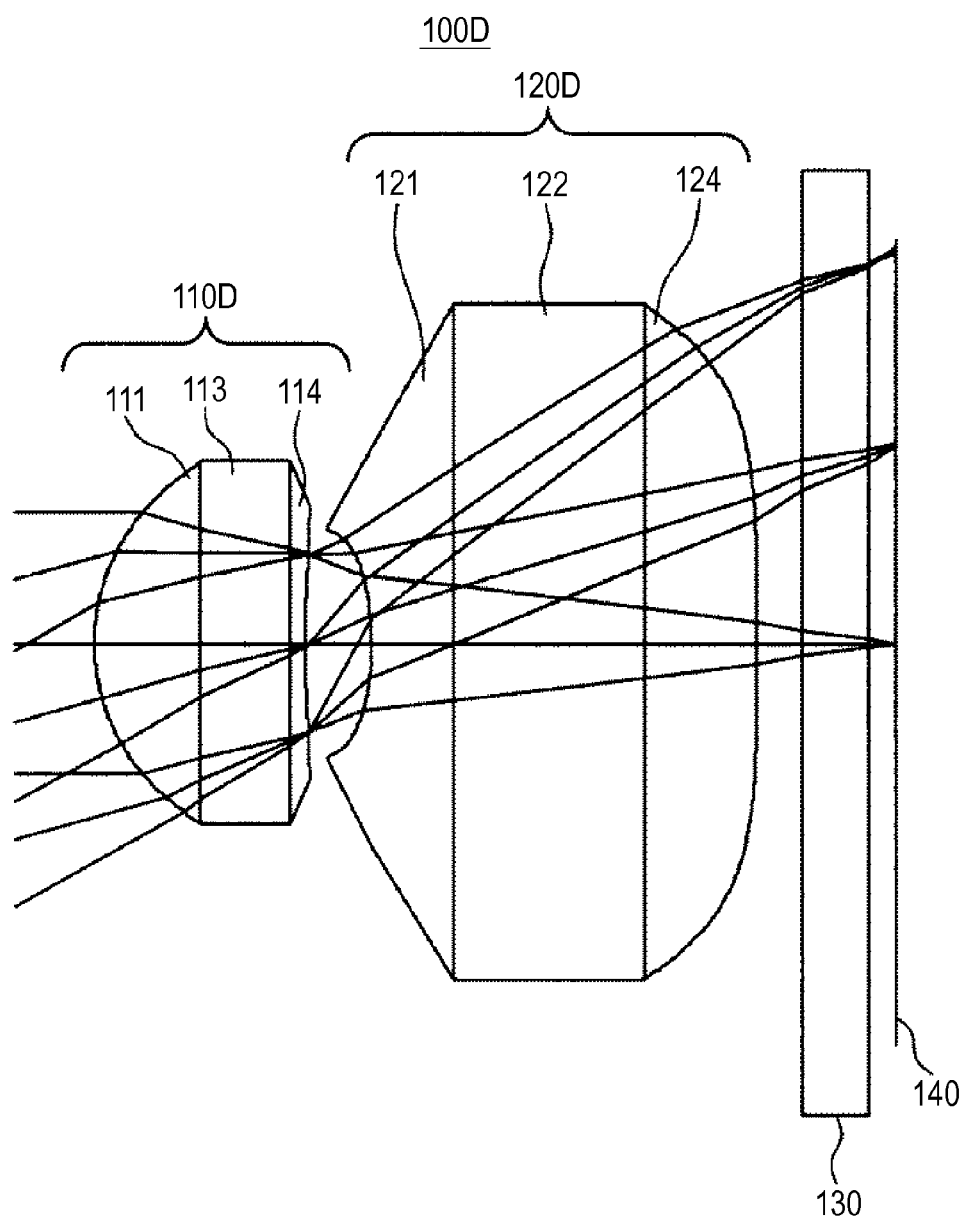
FIG. 10 is a view showing a configuration example of an imaging lens according to a fifth embodiment of the invention.

FIG. 10 is a view showing a configuration example of an imaging lens according to a fifth embodiment of the invention.

An imaging lens 100D according to the fifth embodiment shown in FIG. 10 shows a state in which the buffer layer of the imaging lens 100A according to the second embodiment shown in FIG. 5 is not shown, illustrating an example of the imaging lens formed by actual design.

The imaging lens 100D of FIG. 10 is equivalent to the imaging lens 100A in FIG. 5 as functions of the imaging lens though the imaging lens 100D is different in the shapes of the second lens element 114, and the difference is not essential.

The detailed explanation of the imaging lens 100D is omitted here.

Also in the imaging lens 100D according to the fifth embodiment, it is possible to obtain the same aberration characteristics as the aberration characteristics shown in FIG. 6A to FIG. 6C.

That is to say, also in the fifth embodiment, the imaging lens including the optical unit in which various aberrations such as spherical, astigmatism and distortion are suitably corrected and which is excellent in imaging performance can be obtained.

The imaging lens 100 as described above includes the first lens group 110 and the second lens group 120, which are arranged in order from the object side OBJS toward the image surface 140 side.

The first lens group 110 includes the first lens element 111, the first buffer layer 112, the first transparent body 113 and the second lens element 114, which are arranged in order from the object side OBJS toward the image surface 140 side.

The second lens group 120 includes the third lens element 121, the second transparent body 122, the second buffer layer 123 and the fourth lens element 124, which are arranged in order from the object side OBJS toward the image surface 140 side.

Therefore, the following advantages can be obtained according to the embodiment.

According to the imaging lens 100 of the embodiment, the optimum lens (optical design) can be realized in wafer level optics.

In the embodiment, the optical length is short while suppressing the optical aberration, allowing the first lens group to have strong positive power as well as allowing the second lens group to have strong negative power.

The chromatic aberration is suppressed in the first lens group and the second lens group respectively to have the optimum configuration, thereby exhibiting good performance.

The shape of the fourth surface of the final surface is made to be an approximately convex shape with respect to the image surface, thereby preventing generation of the ghost.

According to the above, the incident angle with respect to the sensor is loosened to obtain the optimum optical performance, thereby taking sufficient back focus.

The optimum configuration for making the lens in wafer level optics is applied, thereby realizing mass production in low cost.

The optical unit according to the embodiments of the invention has excellent optical characteristics as compared with the normal optical system having the same optical length, that is, the normal optical system of three-groups/three pieces configuration, for example, a three-pieces plastic configuration or three-pieces glass-plastic-plastic configuration.

It is also possible to cut the lens in a similar shape to the imager, which realizes miniaturization, therefore, the invention is also excellent in size.

Moreover, since the technique uses a substrate, the production can be performed more inexpensively, therefore, the optical system having the same optical performance can be manufactured inexpensively as compared with the normal optical system. The wafer level optics will have more advantages according to the invention.

According to the embodiments of the invention, it is possible to realize the imaging lens which is compact with short length as well as excellent in aberration characteristics.

The imaging lens 100, 100A to 100D including the characteristics described above can be applied to lens for a digital camera using an imaging device such as a CCD or CMOS sensor, particularly, a camera to be mounted on small electronic equipment such as a cellular phone.

Figure 11:
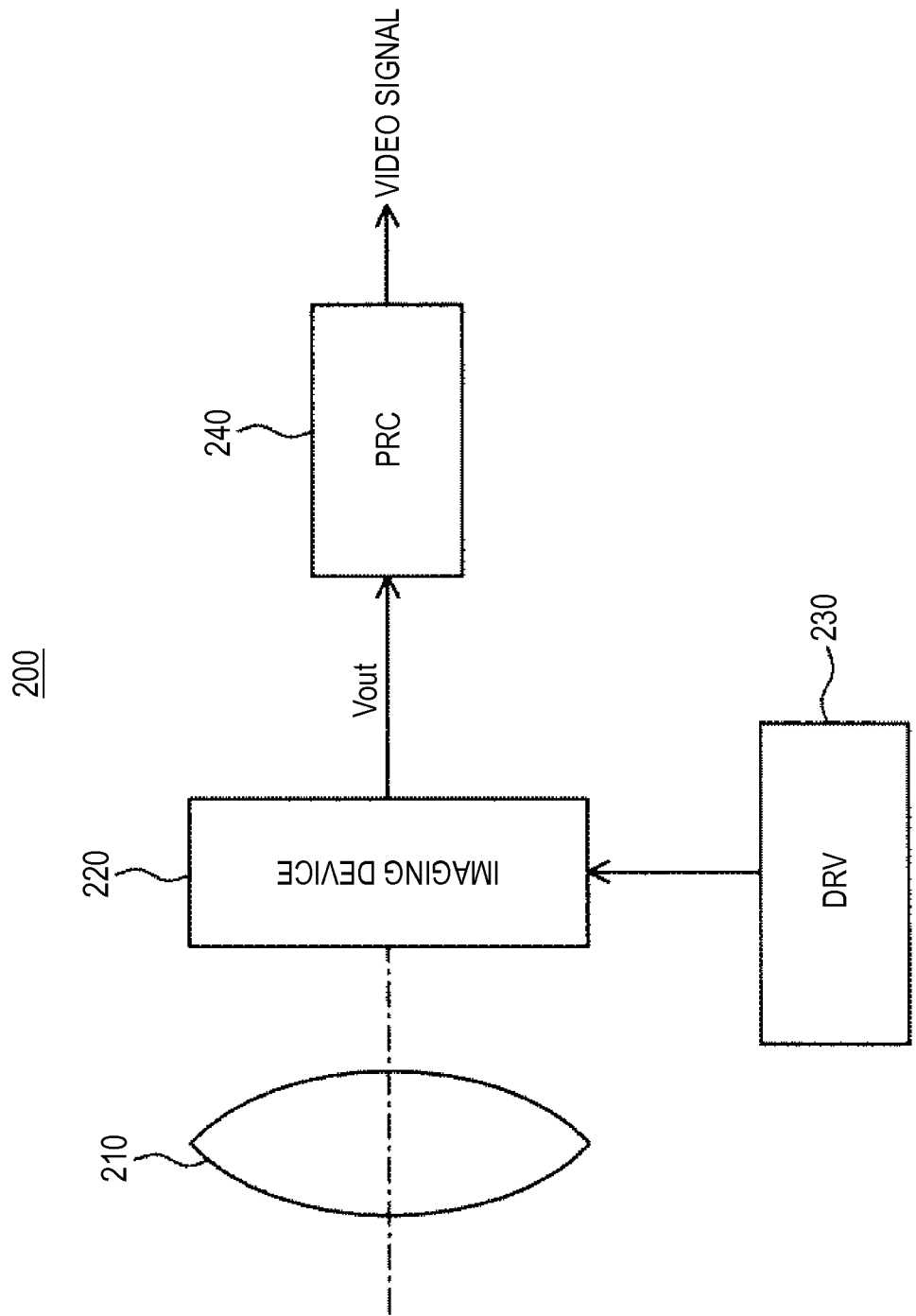
FIG. 11 is a block diagram showing a configuration example of an imaging apparatus to which the imaging lens according to the embodiment is applied.

FIG. 11 is a block diagram showing a configuration example of an imaging apparatus to which the imaging lens including the optical unit according to the embodiment is applied.

An imaging apparatus 200 includes an optical system 210 to which the imaging lenses 100, 100A to 100D according to the embodiments of the invention are applied and an imaging device 220 to which a CCD or CMOS image sensor (solid-state imaging sensor) can be applied, as shown in FIG. 11.

The optical system 210 introduces incident light to an imaging surface including a pixel area of the imaging device 220 to form a subject image.

The imaging apparatus 200 further includes a drive circuit (DRV) 230 driving the imaging device 220 and a signal processing circuit (PRC) 240 processing output signals of the imaging device 220.

The drive circuit 230 includes a timing generator (not shown) generating various timing signals including a start pulse or a clock pulse driving the circuit in the imaging device 220, which drives the imaging device 220 by a prescribed timing signal.

The signal processing circuit 240 performs prescribed signal processing with respect to output signals of the imaging device 220.

Image signals processed in the signal processing circuit 240 are recorded in a recording medium such as a memory. The image information recorded in the recording medium is hard-copied by a printer and the like. Additionally, the image signals processed in the signal processing circuit 240 are outputted on a monitor including a liquid crystal display and the like as moving pictures.

As described above, the imaging lenses 100, 100A to 100D described above are mounted as the optical system 210 on the imaging apparatus such as the digital still camera, thereby realizing a highly accurate camera with lower power consumption.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit, comprising:
   a first lens group including a first lens element, a first transparent body, and a second lens element, which are arranged in order from an object side toward an image surface side; and
   a second lens group including a third lens element, a second transparent body and a fourth lens element, which are arranged in order from the object side toward the image surface side,
   wherein,
   a refractive index ng1 of the first transparent body of the first lens group is different than a refractive index ng2 of the second transparent body of the second lens group,
   a condition of $1.65 \leq ng1$ is satisfied, and
   a condition of $12 \leq vg1 \leq 45$ is satisfied in which vg1 represents an Abbe number of the first transparent body of the first lens group.

2. The optical unit according to claim 1, wherein the refractive index ng1 satisfies the following condition:

$$1.65 \leq ng1 \leq 2.2.$$

3. The optical unit according to claim 1, wherein the first lens element is a flat/convex lens in which the object side is convex and the image surface side is flat.

4. The optical unit according to claim 1, wherein the second lens unit is a flat/concave lens in which the object side is flat and the image surface side is concave.

5. The optical unit according to claim 1, wherein the third lens unit is a flat/concave lens in which the object side is concave and the image surface side is flat.

6. The optical unit according to claim 1, wherein the fourth lens element is a flat/convex lens in which the object side is flat and the image surface side is convex.

7. The optical unit according to claim 1, wherein the fourth lens element is a flat concavo-convex lens in which the object side is flat and the image surface side has both concavity and convexity.

8. The optical unit according to claim 1, wherein a focal length fg1 of the first lens group satisfies the following conditional expression:

$$1.2 \leq fg1 \leq 4.$$

9. The optical unit according to claim 1, wherein a focal length fg2 of the second lens group satisfies the following conditional expression:

$-10 \leq fg2 \leq -1.2$.

10. The optical unit according to claim 1, wherein an Abbe number vs1 of the first lens element of the first lens group satisfies the following condition:

$45 \leq vs1 \leq 100$.

11. The optical unit according to claim 1, wherein a refractive index ng2 and an Abbe number vg2 of the second transparent body of the second lens group satisfy the following conditions:

$ng2 \leq 1.65$, and $35 \leq vg2$.

12. The optical unit according to claim 1, wherein a curvature radius Rs4 of a convex surface of the fourth lens element satisfies the following condition:

$Rs4 \leq -3$ or $Rs4 \geq 10$.

13. The optical unit according to claim 1, wherein a thickness Tg1 of the first transparent body and a thickness Tg2 of the second transparent body satisfy the following conditions:

$0.2 \leq Tg1 \leq 0.7$[mm], and $0.2 \leq Tg2 \leq 2.5$[mm].

14. The optical unit according to claim 1, wherein an Abbe number vs2 of the second lens element satisfies the following condition:

$28 \leq vs2 \leq 65$.

15. The optical unit according to claim 1, wherein an Abbe number vs3 of the third lens element satisfies the following condition:

$28 \leq vs3 \leq 42$.

16. The optical unit according to claim 1, wherein at least one of the first transparent body and the second transparent body is made of glass.

17. The optical unit according to claim 1, wherein at least one lens element of the first lens element, the second lens element, the third lens element, and the fourth lens element is made of ultraviolet curing resin.

18. The optical unit according to claim 1, wherein at least one lens element of the first lens element, the second lens element, the third lens element, and the fourth lens element is made of thermosetting resin.

19. An optical unit, comprising:
a first lens group; and
a second lens group, which are arranged in order from an object side toward an image surface side, wherein,
the first lens group includes a first lens element, a first buffer layer, a first transparent body, and a second lens element, which are arranged in order from the object side toward the image surface side,
the second lens group includes a third lens element, a second transparent body, a second buffer layer, and a fourth lens element, which are arranged in order from the object side toward the image surface side, and
a refractive index ng1 and an Abbe number vg1 of the first transparent body of the first lens group satisfy the following conditions:

$1.65 \leq ng1$, and $12 \leq vg1 \leq 45$.

20. The optical unit according to claim 19, the optical unit being configured such that when a thickness of the first buffer layer is too thick, the aberration occurs and optical characteristics, particularly, the astigmatism and the core aberration deteriorate, and when the thickness of the second buffer layer is too thin, it is difficult to obtain the accuracy of shape in the vicinity of the boundary.

21. The optical unit according to claim 19, wherein a refractive index ng2 and an Abbe number vg2 of the second transparent body of the second lens group satisfy the following conditions:

$ng2 \leq 1.65$, and $35 \leq vg2$.

22. An imaging apparatus, comprising:
an imaging device; and
an optical unit to form a subject image on the imaging device, the optical unit including a first lens group, and a second lens group, which are arranged in order from an object side toward an image surface side,
wherein,
the first lens group includes a first lens element, a first transparent body, and a second lens element, which are arranged in order from the object side toward the image surface side,
the second lens group includes a third lens element, a second transparent body and a fourth lens element, which are arranged in order from the object side toward the image surface side,
a refractive index ng1 of the first transparent body of the first lens group is different than a refractive index ng2 of the second transparent body of the second lens group,
a condition of $1.65 \leq ng1$ is satisfied, and
a condition of $12 \leq vg1 \leq 45$ is satisfied in which vg1 represents an Abbe number of the first transparent body of the first lens group.

23. The optical unit according to claim 22, wherein a condition of $1.65 \leq ng1 \leq 2.2$ is satisfied.

* * * * *